United States Patent [19]
Alexander

[11] 3,751,278

[45] Aug. 7, 1973

[54] METHOD OF TREATING ASPHALT

[75] Inventor: Stephen H. Alexander, St. Louis, Mo.

[73] Assignee: Tosco-Lion, Inc., El Dorado, Ark.

[22] Filed: Mar. 6, 1972

[21] Appl. No.: 232,202

Related U.S. Application Data

[63] Continuation of Ser. No. 31,779, April 24, 1970, abandoned, which is a continuation-in-part of Ser. No. 489,061, Sept. 21, 1965, abandoned.

[52] U.S. Cl. .................. 106/273 R, 94/20, 208/22, 208/39
[51] Int. Cl. ........................ C08h 13/00, C09d 3/24
[58] Field of Search .............................106/273–285; 208/22, 39, 45, 279; 94/20, 23

[56] References Cited
UNITED STATES PATENTS 1,092,448  4/1914  Melamid ............................. 208/279

3,291,872  12/1966  Brown et al. .................. 106/281 UX

FOREIGN PATENTS OR APPLICATIONS 823,563  9/1969  Canada .............................. 106/273

*Primary Examiner*—Joan B. Evans
*Attorney*—Allen G. Weise

[57]  ABSTRACT

The method of treating asphalt by mixing without air-blowing a vacuum distilled asphalt and a mixture of phosphoric acids having an $H_3PO_4$ equivalent of greater than 100 percent concentration at elevated temperatures and the asphalt compositions thus prepared having significantly increased viscosity.

10 Claims, No Drawings

METHOD OF TREATING ASPHALT

RELATED CASES

This application is a continuation application of U.S. application Ser. No. 31,779, filed Apr. 24, 1970, and now abandoned, which earlier application in turn is a continuation-in-part application of U.S. application Ser. No. 489,061, filed Sept. 21, 1965, and now abandoned.

BACKGROUND OF THE INVENTION

The present invention relates to a method for modifying the physical properties of an asphalt and to the asphalt compositions obtained therefrom. More particularly, the present invention relates to a method for altering the relationship of certain physical properties of an asphalt and to particularly useful asphalt compositions resulting from said method.

The physical properties of asphalts vary over a rather wide range. However, in order to meet requirements necessary for many uses of asphalt, it is necessary to modify the properties of existing asphalts. Asphalts may be modified by such well known treating means as solvent extraction, air-blowing and the like. Though these means suffice in many instances, they are inadequate in others. Most of the presently known asphalt treating methods result in a simultaneous change in all of the physical properties of an asphalt. For example, both solvent extraction and air-blowing, if bringing about a substantial change in one property of an asphalt also bring about significant changes in other closely related properties. Thus, when it is necessary or desirable to change one of the physical properties of an asphalt, for example viscosity, without a significant change in a closely related property such as penetration in the case of viscosity, these well-known asphalt treating techniques are usually inadequate.

SUMMARY

It is an object of the present invention to provide a new and novel method of treating asphalt. Another object of the present invention is to provide a novel method of altering the relationship of certain physical properties of asphalts. It is another object of the present invention to provide a method for altering the viscosity-penetration relationship of an asphalt. Yet another object of the present invention is to provide a method for substantially increasing the viscosity of an asphalt without significantly decreasing the penetration of the asphalt. A further object of the present invention is to provide new and novel asphalt compositions having unique temperature susceptibility characteristics. An additional object of the present invention is to provide a method for preparing asphalt compositions having unique temperature susceptibility characteristics. Another object of the present invention is to provide new and novel asphalt compositions particularly suitable for use in highway construction and maintenance. Additional objects will become apparent from the following description of the invention herein disclosed.

The present invention which fulfills these and other objects comprises in one of its embodiments a method for treating asphalt which comprises mixing without air-blowing, a vacuum distilled asphalt and a mixture of phosphoric acids having an $H_3PO_4$ equivalent of greater than 100 percent concentration under conditions such that said phosphoric acid mixture is thoroughly and evenly dispersed throughout said asphalt. Novel compositions are obtained by this method of treating which comprises a vacuum distilled asphalt containing intimately dispersed therethrough an acid mixture consisting of a mixture of phosphoric acids having an $H_3PO_4$ equivalent of greater than 100 percent concentration.

The method of treating asphalt described and claimed herein provides the advantage of allowing substantial alteration of the viscosity of vacuum distilled asphalt without a significant change in the penetration of the asphalt. Further, this method of treating such asphalts produces asphalt compositions having unique temperature susceptibility characteristics. The asphalt treating method of the present invention has the further advantage of providing a means for preparing asphalt compositions particularly useful in highway construction and maintenance.

DESCRIPTION OF PREFERRED EMBODIMENTS

To further describe and to exemplify the present invention, the following examples are presented. These examples are in no manner to be construed as limiting the present invention.

EXAMPLE I

A vacuum distilled asphalt obtained from a Smackover crude oil from Smackover Field, Ark., having a penetration at 77°F of 69 mm/10 and a viscosity at 140°F of 2,687 poise was heated to a temperature of 260°C. To the asphalt was added with constant agitation and without air-blowing, a phosphoric acid mixture in the amount of 0.4 parts by weight per 100 parts by weight of asphalt. The phosphoric acid mixture was equivalent to a 117 percent $H_3PO_4$. The phosphoric acid mixture consisted of 3.3 percent by weight orthophosphoric acid, 9.8 percent by weight pyrophosphoric acid, 10.8 percent by weight tripolyphosphoric acid, 11.2 percent by weight tetrapolyphosphoric acid, 10.4 percent by weight pentapolyphosphoric acid, 8.8 percent by weight hexapolyphosphoric acid, 8.4 percent by weight heptapolyphosphoric acid, and 37.3 percent by weight higher polymer phosphoric acids. Agitation was continued until the phosphoric acid mixture was thoroughly and evenly dispersed through the asphalt. The resulting asphalt was found to have a penetration at 77°F of 66 mm/10 and a viscosity at 140°F of 3,826 poises.

The importance of the above exemplified method of treating asphalt becomes apparent from consideration of the specifications set forth by the Louisiana State Highway Department for a particular grade of asphalt. These specifications require an asphalt having a penetration at 77°F within the range of 60–70 mm/10 and a viscosity at 140°F of above 3,600 poises. The vacuum distilled asphalt with which the phosphoric acid mixture was admixed in Example I had a penetration within the specified range but the viscosity was without the specified limitation. After mixing the phosphoric acid mixture with the asphalt in accordance with the present invention, the resulting composition was well within the limitation of the highway department specifications. Air-blowing of the same vacuum distilled asphalt to a degree necessary to obtain the viscosity defined by the specification resulted in a decrease in the penetration such that it was no longer within the specified limits. It should be noted that even if an asphalt were used which could be air-blown to the specified properties, still the

EXAMPLE II

Another crude vacuum distilled asphalt also derived from a Smackover crude oil from Smackover Field, Ark., but having a penetration at 77°F of 98 mm/10 and a viscosity at 140°F of 1,507 poises was treated as described in Example I above with a phosphoric acid mixture equivalent to 105 percent $H_3PO_4$. This phosphoric acid mixture consisted of 49.3 percent by weight of orthophosphoric acid, 42 percent by weight of pyrophosphoric acid, 8.2 percent by weight tripolyphosphoric acid and 0.4 percent by weight higher acids. The amount of the phosphoric acid mixture was an amount sufficient to produce an $H_3PO_4$ equivalent concentration in the resulting asphalt composition of 0.53 percent by weight. The acid containing asphalt composition had a penetration at 77°F of 90 and a viscosity at 140°F of 2,031 poises.

As in Example I above, the importance of the present method of preparing asphalt compositions is illustrated by consideration of the specifications set forth by the Louisiana State Highway Department for another grade of asphalt. In this instance, the specifications require an asphalt composition having a penetration at 77°F of 85 to 100 mm/10 and a viscosity at 140°F in excess of 1,800 poises. The crude vacuum distilled asphalt of Example II met these specifications as to the penetration at 77°F, but not as to viscosity at 140°F. Treatment of the crude asphalt with the phosphoric acid mixture of the present invention under the conditions of the present invention altered the viscosity of the resulting composition sufficiently to place it within the limitation of the specification without causing the penetration to change sufficiently to fall outside the limitations of the specification.

The asphaltic compositions prepared in each of the Examples above were found to fully meet the requirements for a paving grade asphalt.

Asphalts which may be treated in accordance with the herein disclosed and claimed method of treating asphalts to alter the viscosity-penetration relationship include all asphalts which have been vacuum distilled to produce an asphalt product having an initial boiling point of at least 900°F, and particularly residual asphalts, air-blown asphalts and solvent extracted asphalts.

Residual asphalts are most often obtained from distillation of a crude oil, particularly those of low API gravity. This distillation may be an atmospheric distillation, a vacuum distillation, or an atmospheric topping or distillation operation followed by a vacuum reduction or distillation. Only residual asphalts obtained from one of the last two types of distillation will normally display initial boiling points of at least 900°F and hence are useful in the present method. Among the crude oils which are useful as a source of such asphalts are the California crudes, mid-continent crudes, South Arkansas and East Texas crudes and the like.

The air-blown asphalts are most often obtained by passing air or other similar oxygen containing compositions through an asphalt mass at elevated temperatures. The asphalt mass may be a residual asphalt or a solvent treated asphalt, but for the present invention a vacuum distilled asphalt which is thereafter air-blown is required. Air-blowing may be carried out either in the absence or in the presence of a catalyst.

Solvent extracted asphalts are those asphalts which are most often prepared by the solvent extraction of a residual asphalt or air-blown asphalt with a low molecular weight hydrocarbon solvent, usually a paraffinic hydrocarbon such as propane, butane, or mixtures thereof. For the present invention such an asphalt which has been vacuum distilled to an initial boiling point of at least 900°F is required.

The phosphoric acid mixtures of the present invention must be equivalent to an $H_3PO_4$ concentration of greater than 100 percent. The particular mixture of phosphoric acid may vary so long as it meets this concentration requirement. Table I below is illustrative of the varied compositions of mixed polyphosphoric acids which comprise such mixtures having an $H_3PO_4$ equivalent of greater than 100 percent concentration. All such mixtures as well as those of even higher $H_3PO_4$ equivalent concentrations are suitable for the present treatment process.

TABLE I.—COMPOSITION OF THE STRONG PHOSPHORIC ACIDS [1].

| Weight percent | | | | Percentage as phosphoric acids | | | | | | | |
|---|---|---|---|---|---|---|---|---|---|---|---|
| $H_3PO_4$ | $P_2O_5$ | Ortho | Pyro | Tri-poly | Tetra-poly | Penta-poly | Hexa-poly | Hepta-poly | Octa-poly | Nona-poly | Higher |
| 101 | 73.0 | 81.5 | 18.5 | | | | | | | | |
| 104 | 75.0 | 60.2 | 35.4 | 4.4 | | | | | | | |
| 105.5 | 76.2 | 49.2 | 42.0 | 8.4 | 0.4 | | | | | | |
| 107 | 77.1 | 38.5 | 46.8 | 12.2 | 2.5 | | | | | | |
| 108.7 | 78.3 | 28.0 | 49.1 | 16.5 | 5.2 | 1.2 | | | | | |
| 110 | 79.2 | 20.5 | 46.2 | 20.6 | 8.8 | 3.4 | 0.5 | | | | |
| 111.3 | 80.1 | 15.4 | 39.1 | 24.4 | 12.7 | 5.7 | 2.3 | 0.5 | | | |
| 114.7 | 83.0 | 5.6 | 18.7 | 17.8 | 14.7 | 12.0 | 8.6 | 7.2 | 5.1 | 2.5 | 7.8 |
| 116.5 | 83.4 | 3.2 | 9.9 | 10.8 | 11.3 | 10.4 | 8.8 | 8.3 | 8.5 | 6.8 | 22.0 |

[1] From Van Wazer, Phosphorous and Its Compounds (1958).

As may be seen from Table I, the acid mixtures contain orthophosphoric acid, but the mixture must have an $H_3PO_4$ equivalent greater than 100 percent by weight of phosphoric acid. The most readily available phosphoric acid mixtures and most useful for the purposes of the present invention are those of 105 percent and 115 percent $H_3PO_4$ equivalent concentration, which are available on the commercial market from several sources.

The amount of phosphoric acid mixture useful in the present invention will, of course, vary considerably with the result desired to be effected. The amount will increase with the degree of change in viscosity desired. For most applications, the amount of acid mixture used will range from 0.1 percent to 5.0 percent by weight of the asphalt composition. Preferably, the amount of acid mixture used is about 0.2 to 3.0 percent by weight.

The asphalt treating method of the present invention comprises heating vacuum distilled asphalt to a temperature sufficiently high to allow mixing with the phosphoric acid mixture. The actual temperature at which the mixing may occur will, of course, vary with the asphalt since the softening point of asphalts varies to a considerable degree. For most purposes, however, mixing temperatures within the range of 200° to 650°F are used. Preferred, however, are mixing temperatures within the range of 250° to 550°F. After the asphalt has been heated to a temperature sufficient for mixing purposes, at least above its softening point, the phosphoric acid mixture is most often introduced into the asphalt with continuous agitation. Agitation is usually supplied by mechanical means and must be adequate to disperse the phosphoric acid intimately throughout the asphalt. Although a vacuum distilled and then air-blown asphalt may be treated, the present method of treating asphalt does not include air-blowing of the asphalt during mixing or as a part of the treatment, the treatment being carried out without passing air through the asphalt as is done in conventional air-blowing processes.

What is claimed is:

1. A method of modifying the physical properties of an asphalt which comprises mixing together with agitation and without air-blowing
   a. a material consisting of vacuum distilled asphalt having an initial boiling point of at least 900°F. and
   b. from about 0.1 percent to about 5 percent by weight of the asphalt of a mixture of phosphoric acids having an $H_3PO_4$ equivalent concentration of from 105 percent to 117 percent at a temperature within the range from about 200°F. to about 650°F. and above the softening point of the asphalt to thoroughly and evenly disperse the mixture of phosphoric acids throughout the asphalt, whereby the viscosity of the asphalt is substantially increased without significantly decreasing the penetration of the asphalt.

2. The method defined by claim 1 wherein the amount of the mixture of phosphoric acids is from about 0.2 percent to about 3 percent by weight of the asphalt.

3. The method defined by claim 1 wherein the mixing temperature is within the range from about 250°F. to about 550°F.

4. The method defined by claim 1 wherein the mixture of phosphoric acids has an $H_3PO_4$ equivalent concentration of 105 percent.

5. The method defined by claim 1 wherein the mixture of phosphoric acids has an $H_3PO_4$ equivalent concentration of 117 percent.

6. The method defined by claim 1 wherein the asphalt is a residual asphalt.

7. The method defined by claim 1 wherein the asphalt is a solvent-extracted residual asphalt.

8. A paving grade asphalt composition produced by the method defined by claim 1.

9. A paving grade asphalt composition produced by the method defined by claim 4.

10. A paving grade asphalt composition produced by the method defined by claim 5.

* * * * *